United States Patent
Wang et al.

(10) Patent No.: US 7,220,021 B2
(45) Date of Patent: May 22, 2007

(54) COMPACT COLOR ILLUMINATION DEVICE

(75) Inventors: Dongxue Wang, Lake Zurich, IL (US); Zili Li, Barrington, IL (US); George T. Valliath, Winnetka, IL (US)

(73) Assignee: Motorola, Inc., Schaumburg, IL (US)

( * ) Notice: Subject to any disclaimer, the term of this patent is extended or adjusted under 35 U.S.C. 154(b) by 242 days.

(21) Appl. No.: 10/904,860

(22) Filed: Dec. 1, 2004

(65) Prior Publication Data

US 2006/0114674 A1    Jun. 1, 2006

(51) Int. Cl.
*F21V 7/00*    (2006.01)
(52) U.S. Cl. ............... 362/247; 362/231; 362/243; 362/342; 362/343; 359/570; 359/572
(58) Field of Classification Search ............. 362/231, 362/243, 247, 342, 343; 359/15, 19, 28, 359/570–572, 574, 599, 727, 868, 869
See application file for complete search history.

(56) References Cited

U.S. PATENT DOCUMENTS 6,474,845 B1* 11/2002 Mabe et al. .............. 362/296
2002/0191394 A1* 12/2002 Coleman et al. .......... 362/231

* cited by examiner

*Primary Examiner*—Stephen F Husar
*Assistant Examiner*—Meghan K. Dunwiddie

(57) ABSTRACT

The present invention provides a compact color illumination device (100) for emitting collimated light. The illumination device comprises a reflector cup (102), a blazed diffraction grating (108) formed on the inner surface of the reflector cup, and a plurality of light emitting sources (110) positioned linearly in a focal plane of the reflector cup. Each light emitting source emits a different color of light that is incident on the blazed diffraction grating. The light emitted by the light emitting sources is reflected by the blazed diffraction grating, wherein the reflected light is collimated.

14 Claims, 3 Drawing Sheets

COMPACT COLOR ILLUMINATION DEVICE

FIELD OF THE INVENTION

The present invention relates to the field of optics. More particularly, the present invention relates to the illumination devices used in optical equipment.

BACKGROUND

In the recent years, there has been a lot of development in the area of compact color illumination devices. As a result, highly collimated compact color illumination devices have found application in all areas where the conventional illumination devices have failed to meet user requirements. These areas include mobile display devices such as a microprojectors and the flashlight for camera embedded in cell phones. Other application areas include biosensors, and instruments used in medical imaging and surgery. Conventional illumination devices have high power consumption, provide low optical output and low lighting efficiency, and have a bulky size. Therefore, conventional illumination devices are not suitable for use in pocket-sized or other small instruments and equipments.

A full color micro-projector utilizes color sequential technology to obtain improved optical power efficiency and image quality. The color sequential technology uses time division multiplexing to produce colors. A repetitive sequence of red, green, and blue sub-frames is created sequentially in the micro-projector such that the human eye integrates the sub-frames into full-color frames. With the help of the color sequential technology, high display resolution and color saturation can be obtained.

In the current development of compact illumination devices, a package of Red-Green-Blue (RGB) color light emitting chips, arranged in the shape of a triangle, is utilized to achieve color mixing. The triangle arrangement of the package results in each of the light-emitting chips competing for the center spots. As a result, the emitted light patterns do not align perfectly because of the spatial separation of the RGB chips. The light output efficiency also suffers because of the triangle topology.

Furthermore, most light sources for illumination are Lambertian sources, and the intensity of the Lambertian source is directly proportional to the cosine of the angle between the viewing direction and the surface normal to the light source. Lambertian illumination sources cannot be used efficiently in applications such as micro-projectors because the light cone would have to be modified by complicated optics due to the wide angle distribution of the light emission. Moreover, it is difficult to collimate such a color illumination source with high accuracy.

BRIEF DESCRIPTION OF THE DRAWINGS

The present invention is illustrated by way of example and not limitation in the accompanying figures, in which like references indicate similar elements, and in which.

Figure 1:
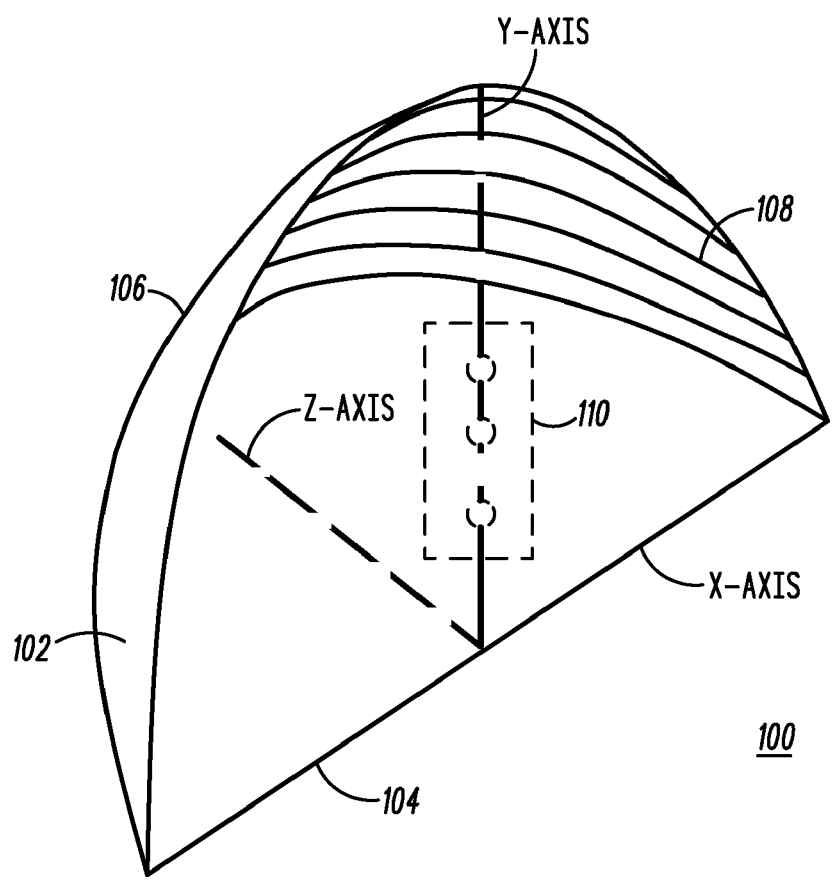
FIG. 1 is a schematic diagram of an illumination device suitable for emitting collimated and aligned light, in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail the particular illumination device in accordance with the present invention, it should be observed that the present invention resides primarily in combinations of apparatus components related to illumination device technology. Accordingly, the apparatus components have been represented where appropriate by conventional symbols in the drawings, showing only those specific details that are pertinent to understanding the present invention so as not to obscure the disclosure with details that will be readily apparent to those of ordinary skill in the art having the benefit of the description herein.

Referring to FIG. 1, a schematic diagram of an illumination device 100 suitable for emitting collimated and aligned light is shown, in accordance with some embodiments of the present invention. The illumination device 100 comprises a reflector cup 102, a blazed diffraction grating 108 formed on the inner surface of the reflector cup 102, and a plurality of light emitting sources 110 positioned linearly in front of the reflector cup 102. "In front of the reflector cup" in the context of this document means that the plurality of light emitting sources are linearly disposed such that the light they emit is directly radiated into the cavity of the reflector cup. In exemplary embodiments of the present invention, the reflector cup 102 can be a quarter sphere, a portion of a sphere other than a quarter sphere (such as a three sixteenths or three eights of a sphere), with a diameter 104 and a vertex 106 that may not be on a portion of the sphere that physically exists, but are defined with reference to a complete sphere that includes the portion that physically exists and the line upon which the light sources are aligned. The position of the lights sources may be described by some of those of ordinary skill in the art as being within a focal plane of the reflector cup.

According to an exemplary embodiment of the present invention, the diameter 104 can be 20 millimeter (mm). FIG. 1 also shows an X-axis, a Y-axis and a Z-axis which characterize the shape and position of the illumination device 100. The diameter 104 and the vertex 106 form an X-Z plane. According to an exemplary embodiment of the present invention, the light emitting sources 110 are positioned along the Y-axis. Each of the light emitting sources 110 may comprise a chip for emitting essentially one primary color, such as a red color, a green color, and a blue color. In the context of this document, a chip is an electrically powered light source, such as an inorganic or organic light emitting diode (LED), or a plurality of LEDs that together function essentially as a point source. Light sources other than LEDs that can be considered essentially "point" light sources may be used. For example, the present invention may be useful with a set of plasma primary color emitters in some circumstances. These chips are together referred to as RGB light emitting sources. In one embodiment of the present invention, the size of each of the RGB light emitting sources is 0.5 mm by 0.5 mm, but light emitting sources of other sizes can be used equally well. In a specific embodiment, the RGB light emitting sources are positioned vertically along an axis at a distance of 4.0 mm for the red chip, 3.0 mm for the green chip, and 2.6 mm for the blue chip. The axis is perpendicular to the plane containing the vertex 106 and diameter 104 of the reflector cup 102. In the example illustrated in FIG. 1, this is the Y axis. In the embodiments described with reference to FIGS. 1–3, better performance may generally be achieved by using chips that radiate light, which is diffracted, reflected and collimated simultaneously by a blazed diffraction grating embedded in the reflecting cup. Moreover, those chips are transparent, so that they do not block light reflected from the reflecting cup.

The blazed diffraction gratings 108 comprise a diffractive layer that includes gratings. The gratings generally include a large number of equally spaced and parallel grooves or lines, which diffract light into multiple orders at multiple directions. The spacing of the lines determines the specific direction into which an incident light is diffracted. In an exemplary embodiment, a grating period of one micrometer can be used for the purpose of the present invention. In an alternate embodiment, holographic gratings may be used. The grooves in the holographic grating may be of unequal distribution. A blaze can be defined as the concentration of a limited region of a light spectrum into any order other than a zero order. The effect of the blazing in the blazed diffraction gratings 108 is such that most of the optical power that is generated by the light sources can be shifted into the desired diffraction order. In the blazed diffraction gratings 108, the diffraction lines are parallel to the X-Z plane. In an exemplary embodiment of the present invention, the blazed diffraction gratings 108 are embedded into the reflector cup 102 using an optical interference method. The optical interference method is well known in the art. In alternative embodiments of the present invention, other techniques for embedding the blazed diffraction gratings 108 such as, digital optics or binary optics can alternatively be used.

According to an embodiment of the present invention, the light emitting sources 110 are positioned according to the first order diffraction relation from the grating. The spatial separations of the light emitting sources 110 are offset based on the grating diffraction. Considering the first order diffraction relation of the blazed grating, the position of each light emitting source 110 can be determined with the following formula:

$$Y(\lambda) = m f \lambda / d$$

Where,

Y is the distance of the light emitting source 110 from the x-z plane;

m is the diffraction order;

$\lambda$ is the wavelength of the color light emitting from the light emitting source 110;

f is a focal length of the reflector cup 102; and d is the grating period along the y direction for the blazed diffraction gratings 108.

The offset $Y(\lambda)$ is such that the colored lights emitted from the light emitting sources 110 are substantially collimated after reflection. A higher diffraction order of the blazed diffraction gratings 108 results in larger spatial separations of the light emitting sources 110. The collimated light is aligned along the Z axis, which is perpendicular to the linear arrangement of the light emitting sources, as described above.

It should be noted that the reflected light is less than perfectly collimated only by practical limitations in achieving ideal gratings and by light sources that are not ideal point sources. To the extent that the emitting surfaces of the active devices within the light sources extend beyond the exact points defined by the above formulas, there will be some dispersion of the reflected light, so it is described as substantially collimated light. LED light sources are good approximations of point sources in some applications, depending on the size of the reflector cup.

Figure 2:
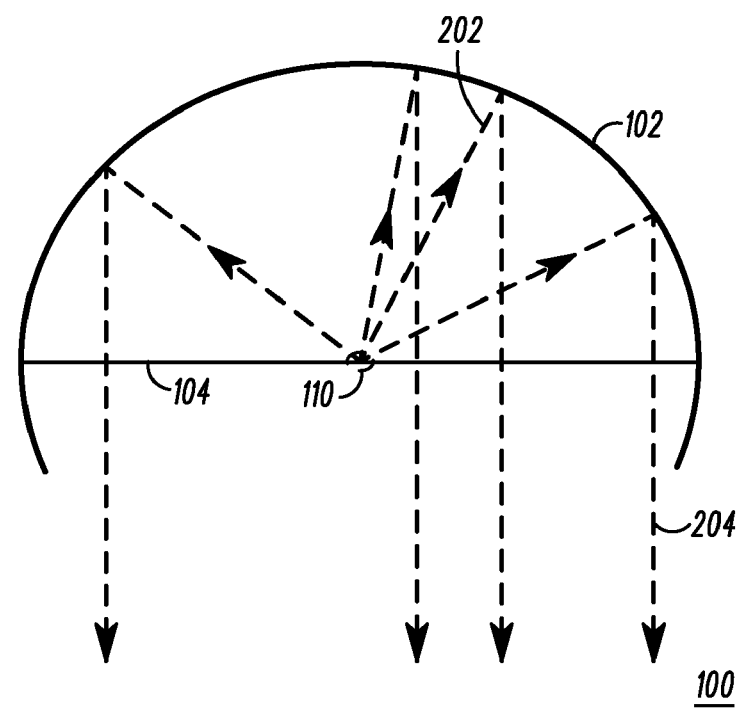
FIG. 2 is a schematic diagram of top view of the illumination device, in accordance with an embodiment of the present invention.

Referring to FIG. 2, a schematic diagram shows a cross sectional view of the illumination device 100, with the cross section taken in a plane parallel to the X-Z axis (FIG. 1), through one of the light emitting sources. Since the light emitting sources 110 are positioned linearly along the Y axis, the other two light emitting sources are not visible in FIG. 2. (Note that a similar cross section taken through one of the other light emitting sources would have a larger or smaller diameter circular periphery.) The light emitting sources 110 emit light rays in various directions within the reflector cup 102 as exemplified by the light rays 202 from the one light emitting source visible in this diagram. The blazed diffraction gratings 108 diffract the light rays 202 and are reflected by the reflector cup 102 in so that they are collimated and parallel to the Z direction.

Figure 3:
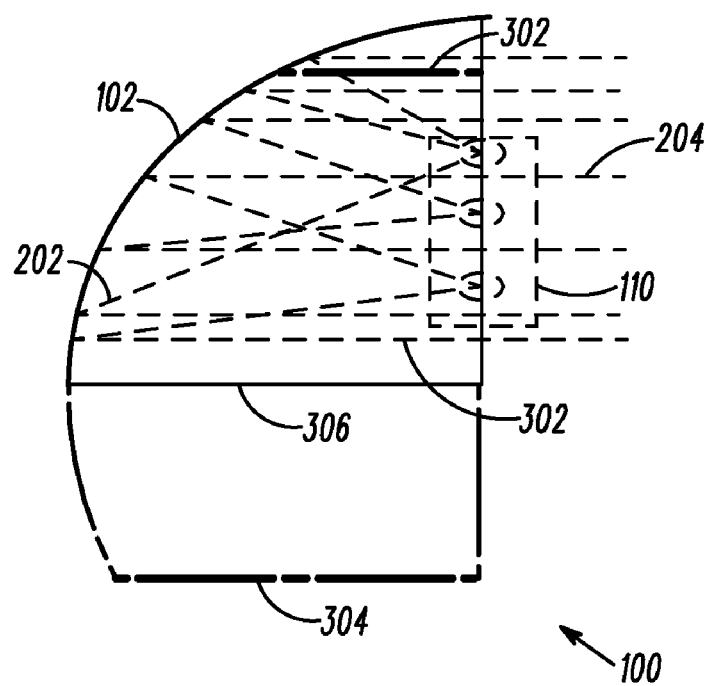
FIG. 3 is a schematic diagram of side view of the illumination device, in accordance with an embodiment of the present invention.

Referring to FIG. 3, a schematic diagram shows a cross sectional side view of the illumination device 100 taken at the X-Y axes. The light rays 202 emitted by the light emitting sources 110 are reflected by the reflector cup 102. The light rays 202 can be emitted in any direction, but in some embodiments most of the light energy is directed into the reflector cup. The reflected light rays 204 emerge as a collimated and aligned light beam, aligned in the direction of the Z axis. FIG. 3 also illustrates possible shapes, namely a shape 302, a shape 304, and a shape 306, for the reflector cup 102. The shape 302 is less than a quarter sphere shape. The shape 302 of the reflector cup 102 reduces the size of the reflector cup 102. The small size is an advantage for applications where the illumination device 100, in accordance with the present invention, is embedded in pocket devices such as the display screens of mobile phones. The shape 304 is a larger than quarter sphere shape for reflector cup 102. The shape 306 is the quarter sphere itself.

Embodiments of the present invention may overcome the problem of light blocking that occurs in some conventional light emitting sources. The light blocking effect occurs because in some conventional light emitting sources, the light emitting sources are not transparent, so that when the light emitting sources are placed in the path of the reflected light, they block some of the reflected light, reducing the efficiency of the illumination device. Examples of such light emitting sources are typical non-transparent LEDs. The problem of light blocking can be solved by using a slanted configuration.

Figure 4:
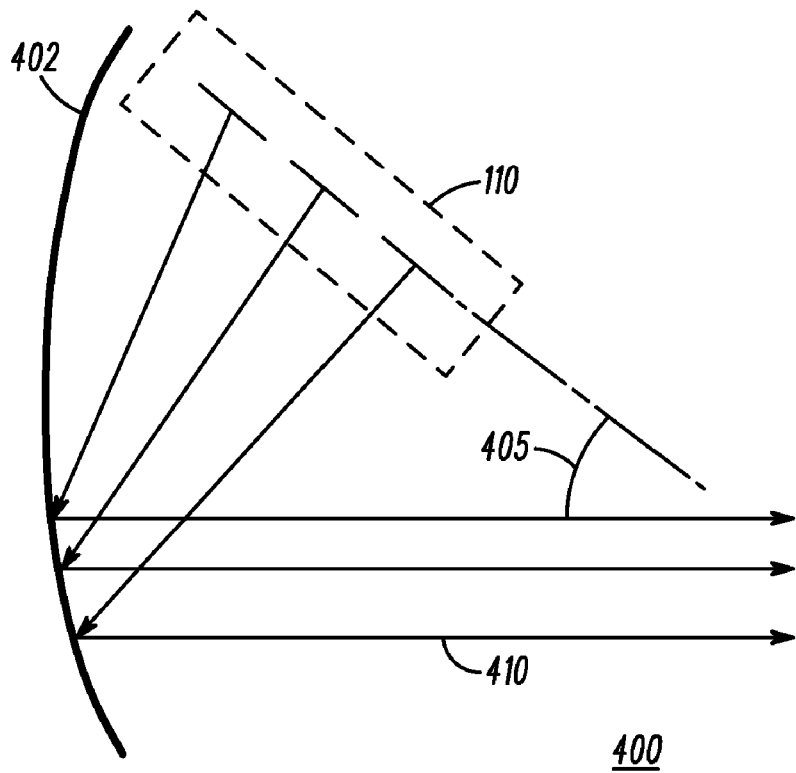
FIG. 4 is a schematic diagram illustrating a slanted configuration of RGB light emitting sources utilized in the illumination device, in accordance with some embodiments of the present invention.

Referring to FIG. 4, the slanted configuration according to an exemplary embodiment of the present invention is illustrated. In this embodiment, the light emitting sources are positioned in a linear arrangement in front of the reflector cup, and rays emitted from the light emitting sources 110 are incident on the reflector cup 402 in a slanted manner. The position of the lights sources may be described by some of those of ordinary skill in the art as being within a focal plane of the reflector cup. The reflected light is collimated and aligned along an axis 410 that is at an angle 405 with reference to the linear arrangement of the light emitting sources. In this embodiment, it will be appreciated that for best efficiency, the shape of the reflector cup 402 can be based on the angle 405 of the slant with reference to the desired axis of collimation 410, as well as the factors expressed in the equation described above.

The reflector cup 102, 402 may be a shape other than a sphere, such as a spheroid, with appropriate alterations used in the formulas to define the linear positions of the light sources as would be evident to one of ordinary skill in the art.

In some embodiments of the present invention, efficiency of the illumination device and the quality of the collimation can be improved by applying metal layer coatings to peripherals of each light emitting source within the light emitting sources 110. The metal layer coating covers only the peripheries of each light emitting source. The front side is the side of the light emitting sources 110 that faces the reflector cup 102. The metal layer shapes the light beam of the light source by directing light toward the front that otherwise may emit out the sides of the light sources. Moreover, the metal layer coatings can also function as heat dissipation devices for the illumination device 100.

In some embodiments of the present invention, transparent epoxy and transparent contacts can be employed in the light emitting sources 110 to achieve light emitting sources that are substantially transparent from front to back, including all carriers, substrates, and conductors. Using transparent epoxy to fasten the light sources to transparent carriers and fabricating the electrical contacts of the light sources from transparent materials such as indium tin oxide allows light that has been reflected from the reflector cup to pass thorough the light sources, improving efficiency of the illumination device, particularly in those embodiments in which the light sources are arranged as described with reference to FIG. 1. The efficiency of the illumination device when using such transparent light sources may be also improved by light that emits directly from the back of the light sources. This light may be focused using back side lenses to achieve optimum collimization of the directly emitted light as well as the light passing through the light sources from the reflector cup. In some case, up to approximately 25% of light generated by light sources that could otherwise be lost in a non-transparent design is added to the collimized light beam from the illumination device 100, especially in a configuration according to the embodiments described with reference to FIGS. 1–3.

According to another exemplary embodiment of the present invention, a light shaping diffuser with a high transmission efficiency of 85% to 95% can be applied to the compact light source arrangement described in FIGS. 1–4. In an embodiment, the light shaping diffuser can be a holographic diffuser. However, the present invention should not be considered limited to the holographic diffuser. Any other type of diffuser, such as ground glass diffuser, can also be used. The light shaping diffuser enables a user to control the distribution of the light rays 204. With the help of the light shaping diffuser, the user can define angles to match the numerical aperture of projection lens in micro-projectors. Thus, the light shaping capability of the diffuser can be adaptive to different micro-projection systems.

The various embodiments in accordance to the present invention provide a compact color illumination device. In an exemplary embodiment, a color sequential technology is used to synthesize a light color that is emitted from the light emitting sources 110. However, other non-color sequential technologies can also be used for synthesizing the light color.

Figure 5:
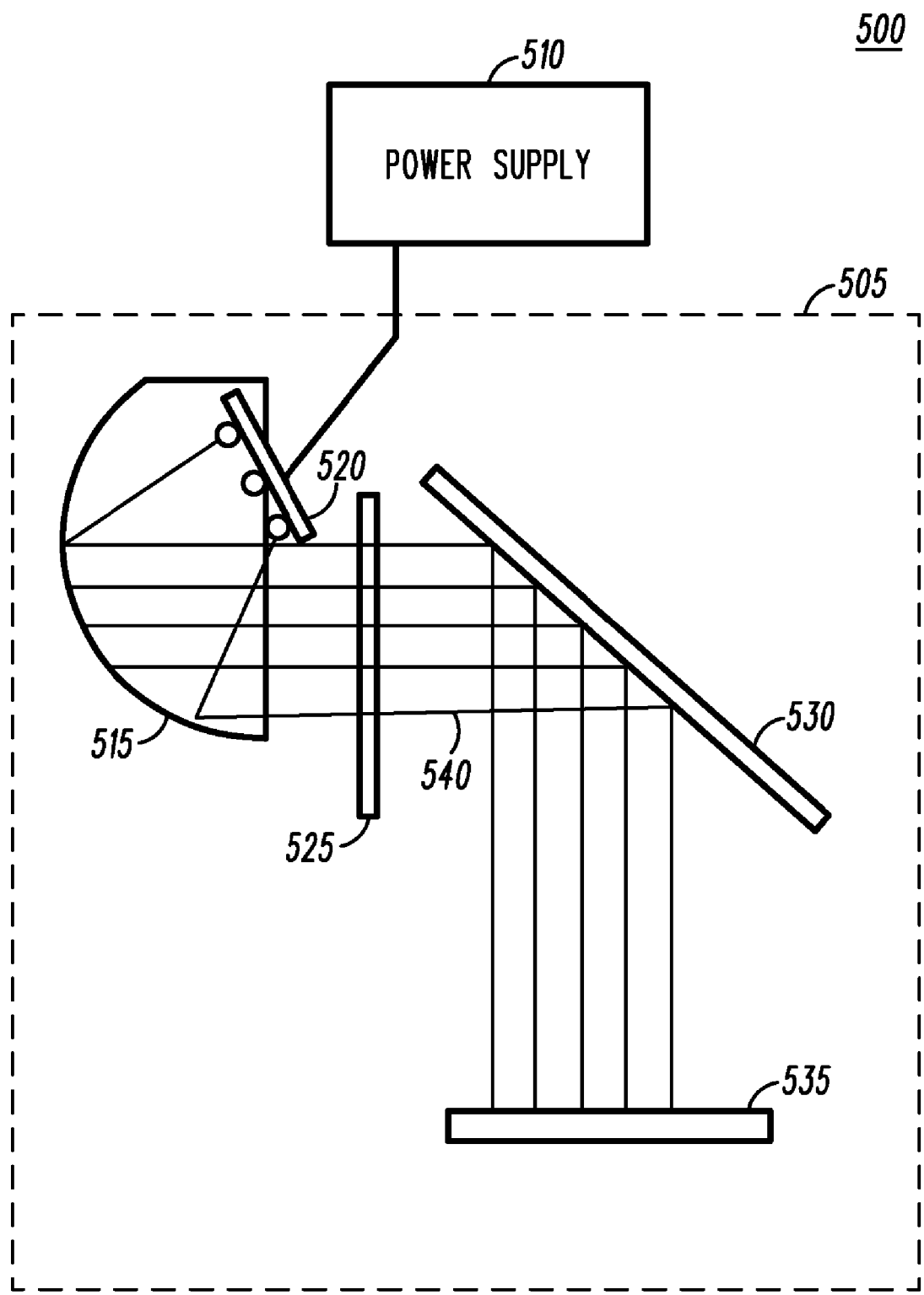
FIG. 5 is an electrical block diagram that represents optical equipment that uses the illumination device, in accordance with some embodiments of the present invention.

Thus, the present invention provides various embodiments for generating collimated and aligned colored light. Referring to FIG. 5, an electrical block diagram is shown that represents optical equipment 500 that comprises an illumination device 505 in accordance with some embodiments of the present invention. Due to compactness of the illumination device 505, it can be used in many types of optical equipment 500 that include a power supply 510 that provides power to the illumination device, such as microprojectors, personal digital assistants, mobile phones, camera flashlight, optical spectroscopy, biosensors, various biomedical imaging paraphernalia and surgery equipments, or the like. The power supply 510 may be a supply such as a converter that converts a mains power source to a direct current voltage, or the power supply may be a battery and power regulator, or the like. In the example optical equipment shown in FIG. 5, the power supply 510 is coupled to a linear arrangement of light sources 520 that collectively generate light from three LED sources that is diffracted by a blazed grating and reflected by a reflector cup 515 as a substantially collimated light beam 540 that passes through an imager 525 (such as a liquid crystal imager). The imaged, collimated light beam then reflects off a mirror 530 and onto a diffuser 535 so that the image may be magnified with a projection lens for viewing. Alternatively it can also be magnified at the imager location (525). In the foregoing specification, the present invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

As used herein, the terms "comprises", "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An illumination device suitable for emitting collimated light, comprising:
    a reflector cup;
    a blazed diffraction grating formed on an inner surface of the reflector cup; and
    a plurality of light emitting sources positioned in a linear arrangement in front of the reflector cup, each light emitting source emitting a different color of light that is incident on the blazed diffraction grating, whereby the light emitted by the plurality of light emitting sources is reflected by the blazed diffraction grating, the reflected light being substantially collimated, wherein the plurality of light emitting sources are positioned in a focal plane of the reflector cup according to a first order diffraction relation with the blazed diffraction grating.

2. The illumination device according to claim 1, wherein the plurality of light emitting sources are red, green and blue (RGB) light emitting diodes.

3. The illumination device according to claim 1, wherein the reflector cup is made of metal.

4. The illumination device according to claim 1, wherein a periphery of each of the plurality of light emitting sources is covered with a metal layer coating to shape a beam of light emitted by the light emitting source.

5. The illumination device according to claim 1, wherein the reflector cup is a portion of a sphere that has a diameter and a vertex, and wherein diffraction lines of the blazed diffraction grating are in planes parallel to a plane that includes the diameter and the vertex, and wherein the plurality of light emitting sources are in a focal plane on an axis perpendicular to the plane that includes the diameter and the vertex.

6. The illumination device according to claim 5, wherein the reflector cup is a quarter sphere.

7. The illumination device according to claim 1 wherein the plurality of light emitting sources are substantially transparent.

8. The illumination device according to claim 7, wherein the illumination device generates a substantially collimated light beam that includes the substantially collimated reflected light and up to approximately 25% of light emitted directly out the backs of the light sources.

9. The illumination device according to claim 1 further comprising a diffuser for controlling a distribution of the collimated light.

10. The illumination device according to claim 9, wherein the diffuser is a holographic diffuser.

11. The illumination device according to claim 1, wherein the blazed grating is arranged to reflect substantially collimated light that is aligned to be perpendicular to the linear arrangement of the plurality of light sources.

12. The illumination device according to claim 1, wherein the blazed diffraction grating is arranged to reflect substantially collimated light that is aligned at a slant angle with reference to the linear arrangement of the plurality of light sources.

13. An illumination device suitable for emitting collimated light, comprising:

a reflector cup having a diameter and a vertex;

a blazed diffraction grating having diffraction lines embedded in the reflector cup, the diffraction lines being parallel to a plane that includes the diameter and the vertex; and a plurality of light emitting sources positioned in a linear arrangement in front of the reflector cup on an axis that is perpendicular to the plane that includes the diameter and the vertex, each light emitting source emitting a different color of light that is incident on the reflector cup and the blazed diffraction grating, whereby the light emitted by the light emitting sources is reflected by the reflector cup, the reflected light being substantially collimated.

14. An optical equipment that comprises:

a power supply; and a illumination device, comprising a reflector cup having a diameter and a vertex, a blazed diffraction grating having diffraction lines embedded in the reflector cup, the diffraction lines being parallel to a plane that includes the diameter and the vertex, and a plurality of light emitting sources that are coupled to the power supply and positioned in a linear arrangement in front of the reflector cup on an axis that is perpendicular to the plane that includes the diameter and the vertex, each light emitting source emitting a different color of light that is incident on the reflector cup and the blazed diffraction grating, whereby the light emitted by the light emitting sources is reflected by the reflector cup, the reflected light being substantially collimated.

* * * * *